UNITED STATES PATENT OFFICE.

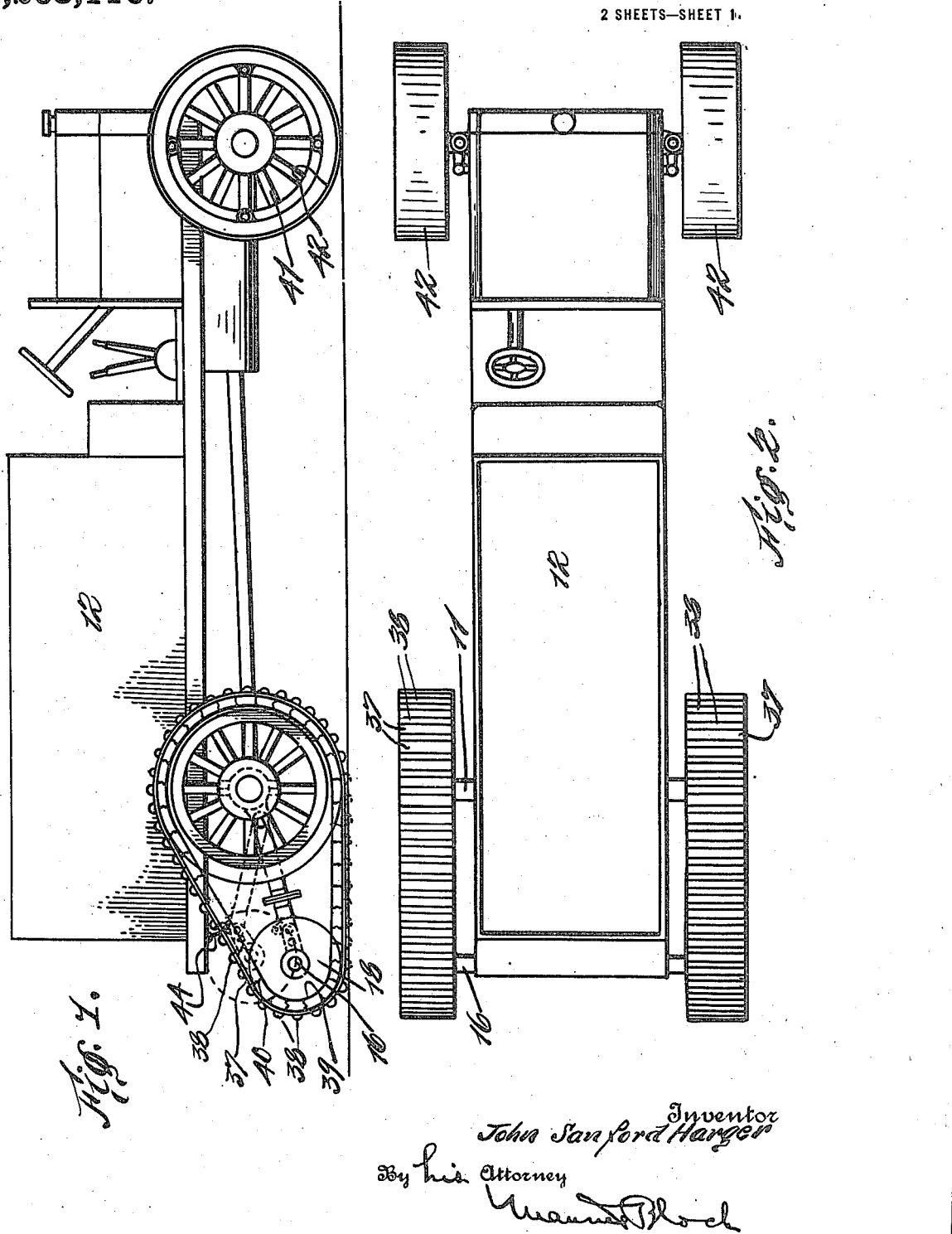

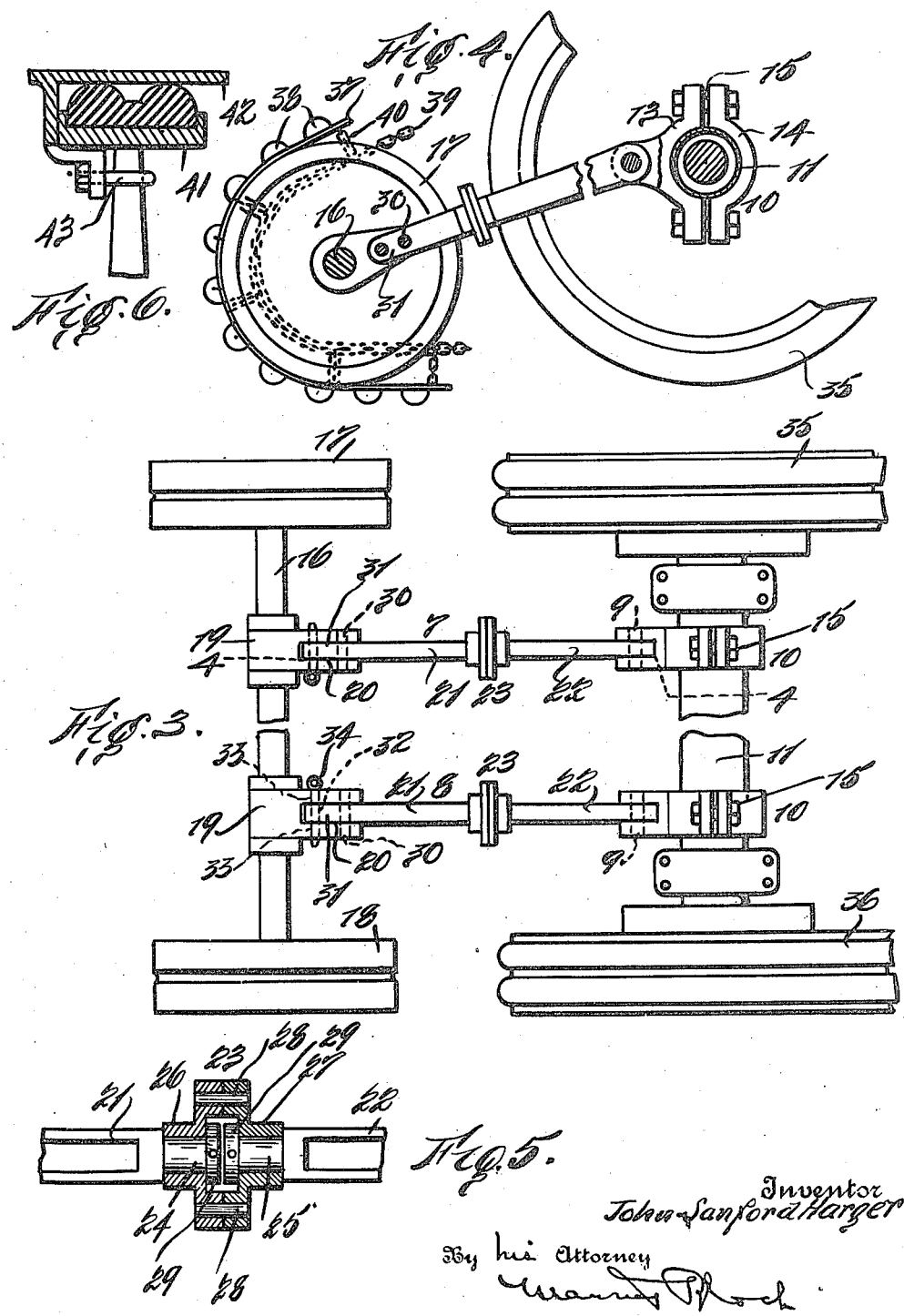

JOHN SANFORD HARGER, OF NYACK, NEW YORK.

TRACTOR ATTACHMENT FOR MOTOR-TRUCKS.

1,268,116.

Specification of Letters Patent.  Patented June 4, 1918.

Application filed June 29, 1917. Serial No. 177,643.

*To all whom it may concern:*

Be it known that I, JOHN SANFORD HARGER, a citizen of the United States of America, residing at Nyack, Rockland county, State of New York, have invented certain new and useful Improvements in Tractor Attachments for Motor-Trucks, of which the following is a full, clear and exact description.

This invention relates to improvements in tractor attachments for motor-vehicles, the object being to provide a framework that can be readily attached to the rear axle-housing of a motor-truck or a touring car. One of the objects of my invention is to provide an inexpensive device that can be attached to any motor-vehicle whereby said motor-vehicle can be transformed into a tractor for hauling plows or other farming implements, my tractor attachment being arranged to be moved in or out of position for use without removing it from the vehicle. A part of my attachment consists of tractor-belts which are placed upon the rear wheels of the vehicle and upon the wheels of the tractor. To apply or remove the belts, the vehicle will be jacked up. I further provide detachable supplemental treads for the front wheels which are broad enough to prevent the same from sinking into soft earth.

I will now proceed to describe my invention in detail, the novel features of which I will point out in the appended claims, reference being had to the accompanying drawings, forming part hereof, wherein—

Figure 1 is a side elevation of a motor-truck having my improvements applied thereto;

Fig. 2 is a plan view thereof;

Fig. 3 is an enlarged plan view of the rear axle-housing of the truck and also of my improved attachment illustrated as connected thereto;

Fig. 4 is a sectional view thereof, the section being taken on a line 4—4 in Fig. 3;

Fig. 5 is an enlarged detail view of the swivel connection for the frame-members of the tractor attachment; and Fig. 6 is a cross sectional view of one of the front wheels showing the detachable tread.

As herein illustrated, my invention comprises a tractor attachment consisting of the frame-members 7 and 8, which, at one end thereof, are pivotally connected, at 9, to brackets 10 applied to the rear axle-housing 11 of the truck 12. The bracket 10 consists of the members 13 and 14, which are clamped to the housing by bolts 15. Further members of the attachment consist of an axle 16 carrying wheels 17 and 18. The wheels 17 and 18 revolve upon the axle 16, the axle being non-rotatable. To the axle 16, I attach brackets 19 each having a jaw 20 to receive the rear end of the frame-members 7 and 8.

Each frame-member 7 and 8 consists of the members 21 and 22 rotatably connected intermediate the ends thereof, as at 23. The adjacent ends of the frame-members 21 and 22 are rounded off to form journals 24 and 25 to fit blocks 26 and 27, respectively, which are secured together by bolts 28. To prevent the members 21 and 22 from being pulled out of the blocks, I provide the end of each journal with a collar 29.

Each frame-member 21 is pivotally connected to its block 19 on the axle 16 by a pin 30, the pivotal connection being intermediate the ends of said members 21 to provide a short arm 31 having an opening 32 to aline with openings 33 in the jaw of the block 19, said openings being arranged to receive a locking-pin 34 when the tractor is in use. When the tractor is not in use (as indicated by dotted lines Fig. 1), the pin 34 will be removed, as will hereinafter be described.

In combination with the frame-members 7 and 8, wheels 17 and 18 and the wheels 35 and 36 of the truck 12, I employ a flexible traction-belt 37 having projections 38 to grip the ground. The belt 37 may be of any suitable material, to which the blocks or projections 38 are secured in any suitable manner.

To maintain the belt upon the wheels, I may provide side members 39 (chains for instance one only being shown) which are connected to the belt 37 by links 40 which may also be short chains, hence the traction-belt can be maintained upon the wheels, the side chains and links preventing the tractor-belt from slipping off sidewise.

When the tractor attachment is in use, I prefer to apply to the front-wheels 41 of the truck a relatively wide auxiliary-tread 42, which is held in place by clamps 43 engaging certain of the spokes of the said wheels.

When the tractor is not in use, it will be held up off the ground, as shown by dotted lines in Fig. 1, by any suitable suspending means such as hooks 44, the pin 34 being removed, and the wheels 17 and 18 hanging from the pin 30. In this position the distance between the center of the axle-housing 11 and center of the axle 16 will be less than the distance between said points when the tractor is in use, for a purpose to be described. When the tractor is not in use the traction-belt will be removed from the wheels, as will also the supplemental treads 42.

To prepare the device for use the belt 37 will be applied while the tractor-frame is suspended, the truck being jacked up to raise the wheels off the ground. After the belt has been applied, the tractor framework will be lowered, and the frame-members pushed downwardly to cause the openings 33 in the blocks 19 and openings 32 in the frame-members 21 to aline, after which the locking-pins 34 will be applied, thereby making a rigid connection. The action of pushing the frame-members 7 and 8 downwardly will be to force the axle 16 outwardly to increase the distance between the center thereof and the center of housing 11, thereby drawing the traction-belt 37 taut. When the belt is first placed upon the wheels it will be too slack for use, but when the axle 16 has been moved out and the pins 34 applied, the belt will be drawn taut enough to propel the vehicle with its load. When prepared for use, the belt 37 will act the same as the traction-belt of a caterpillar-tractor, a detailed description of which need not be given.

The swivel connection 33 allows either the wheel 17 or 18 to rise from the ground, to pass over a stone, or other obstruction, without straining the framework, as the members 21 are arranged to rotate should either one of the wheels 17 or 18 rise or fall below the level of its companion. When the traction-belt is applied, the supplemental treads 42 will also be applied. The connection between the axle-housing 11 and axle 16 of the tractor attachment is a toggle connection to be utilized to draw the traction-belt taut.

The frame-members 7 and 8 and connected parts can be detached from the brackets 10 by withdrawing the pivot-pins 9; or the entire attachment can be removed from the truck by disconnecting the bracket-members 13 and 14, the bolts 15 being withdrawn for this purpose.

The detailed construction hereinbefore described and illustrated in the drawings is but one way to carry out the principles of my invention, and it should be understood that the essential features thereof can be embodied in other forms without departing from the spirit of my invention.

What I claim as my invention is:

1. A tractor attachment consisting of a framework adapted for securement, at one end thereof, to a motor-vehicle, and wheels carried by the framework at the opposite end thereof, said framework being connected intermediate the ends thereof to form a toggle.

2. A tractor attachment consisting of a framework adapted for securement, at one end thereof, to a motor-vehicle, and wheels carried by the framework at the opposite end thereof, said framework consisting of a plurality of rotatably connected members.

3. A tractor attachment consisting of a framework adapted for securement, at one end thereof, to a motor-vehicle, an axle pivotally connected to the outer end of each frame-member, and means to lock the frame-members and axle together to form a rigid structure when the tractor is in use.

4. The combination of a motor-vehicle, a tractor attachment consisting of a plurality of supplemental wheels carried by a frame consisting of a plurality of members connected by a swivel joint, each frame-member being pivotally attached to the vehicle, and a traction-belt arranged for attachment to the wheels of the vehicle and the wheels carried by said frame.

5. In combination with a vehicle, a tractor attachment consisting of a plurality of wheels, a pivoted frame to support said wheels upon the vehicle, said frame consisting of a plurality of members connected by a swivel joint intermediate the ends thereof to form a toggle connection, a traction device consisting of a belt adapted for attachment to said wheels and the wheels of the vehicle, and means to retain the belt in position upon the wheels.

Signed at New York city, N. Y., this 28th day of June, 1917.

JOHN SANFORD HARGER.

Witnesses:
 EDWARD A. JARVIS,
 MAURICE BLOCK.